United States Patent
Binnie, Jr. et al.

[11] Patent Number: 5,837,090
[45] Date of Patent: Nov. 17, 1998

[54] PRECISION ALIGNING AND JOINING OF TWO ARTICLES USING A FLOWABLE ADHESIVE

[75] Inventors: John F. Binnie, Jr.; Keith W. Everill; Roderick M. Harris, all of Tucson, Ariz.

[73] Assignee: Raytheon Company, Los Angeles, Calif.

[21] Appl. No.: 353,851

[22] Filed: Dec. 8, 1994

[51] Int. Cl.⁶ .................................................. B29C 65/54
[52] U.S. Cl. ........................ 156/294; 156/305; 264/262
[58] Field of Search ................... 156/293, 294, 156/305, 423; 264/262; 285/915

[56] References Cited

U.S. PATENT DOCUMENTS

| 2,755,840 | 7/1956 | Bartley | 156/423 |
| 3,338,772 | 8/1967 | McWherter | 156/423 |
| 3,778,892 | 12/1973 | Ostroski | 156/294 |
| 4,137,117 | 1/1979 | Jones | 156/305 |
| 4,244,768 | 1/1981 | Wiechowski et al. | 156/305 |
| 4,277,141 | 7/1981 | Kleiber | 156/305 |
| 4,529,460 | 7/1985 | Hasegawa et al. | 156/92 |
| 4,673,455 | 6/1987 | May | 156/305 |
| 5,183,524 | 2/1993 | Dommer et al. | 156/423 |
| 5,251,276 | 10/1993 | Berkey et al. | 385/43 |
| 5,405,447 | 4/1995 | Berkey et al. | 156/294 |

OTHER PUBLICATIONS

Adhesives Handbook, "Surface Preparation", 1970, pp. 235–257.
Wake, Adhesion and the Formulation of Adhesives, 1982, pp. 193, 194.

*Primary Examiner*—Steven D. Maki
*Attorney, Agent, or Firm*—David W. Collins; Leonard A. Alkov; Glenn H. Lenzen, Jr.

[57] ABSTRACT

A first article having a bore therein is provided with a chamfer region at one end of the bore. A second article is assembled into the bore with a clearance region therebetween, preferably using tooling to hold the articles in precisely the desired positions. A flowable, thermosetting adhesive is placed into the chamfer region. The assembly is heated so that the adhesive flows from the chamfer region into the clearance region, and the adhesive is thereafter cured to join the articles together as defined by the tooling.

15 Claims, 2 Drawing Sheets

PRECISION ALIGNING AND JOINING OF TWO ARTICLES USING A FLOWABLE ADHESIVE

BACKGROUND OF THE INVENTION

This invention relates to the assembly of multicomponent mechanical systems, and, more particularly, to a technique for precisely assembling a gimbal unit.

In one approach to the fabrication of mechanical devices, subcomponents are first fabricated and tested, and thereafter assembled into the final structure. This approach has the advantage that faulty subcomponents can be eliminated or repaired prior to their final assembly. The reliability of the final component is thereby improved.

The assembly of two or more components can itself pose problems. Electrical and imprecise mechanical assemblies usually are straightforward, as electrical connectors and conventional mechanical fastening procedures are well developed. However, highly precise mechanical assembly, where components must be accurately positioned and/or aligned, may be difficult because of constraints imposed upon the final structure.

An example of a challenging mechanical assembly is a pitch-and-roll gimbal assembly used in the seeker of a missile. The roll module and the pitch module are separately fabricated and tested. The two modules are thereafter aligned and joined. Two bushings at the opposite ends of the pitch module are positioned and fastened within corresponding support rings on the roll module. The bushings and support rings must be aligned very precisely so that during service the angular orientation of the seeker unit, mounted to the pitch module, can be accurately determined. The joining must be reliably permanent so that there is no shifting of position during service.

Various techniques have been evaluated for joining the pitch module to the roll module. The pitch module is small in size, on the order of a few inches, making it difficult to work around the module with conventionally scaled tools and fasteners. A cast-in-place technique has been tried, but this approach requires extensive post-joining machining. Any error at this stage leads to the discarding or rework of both modules, which are themselves expensive. A bonding-in-place procedure using adhesives has also been tried. It was found that a small amount of adhesive tended to leak to the unbonded faces of the modules, requiring a final cleanup of excess adhesive. In some cases, this cleanup could be performed. In others, however, at least one face having excess adhesive was physically inaccessible following joining, so that the required cleanup could not be performed.

Although discussed in terms of a particular structure of interest to the inventors, there is a general need for an improved method for assembling and mechanically joining precision structures such as the gimbal unit. Such a procedure should be capable of achieving precision alignment and reliable joining and avoid the need for post-joining working or cleanup. The present invention fulfills this need, and further provides related advantages.

SUMMARY OF THE INVENTION

The present invention provides a method for mechanically aligning and joining two articles precisely. The method achieves a precise alignment, determined by tooling that ensures reproducibility from assembly to assembly. The joining is secure, and does not shift with the passage of time during storage or service. There is no need for machining or cleanup after joining, making the approach ideal for articles with regions that are inaccessible following completion of the assembly and which otherwise might require machining or cleanup. The aligning and joining process is also inexpensive, does not require toxic or environmentally hazardous chemicals or procedures, and does not expose the articles being joined to potential damage.

In accordance with the invention, a method of aligning and joining a first article and a second article comprises the steps of providing a first article having a first local length, and a bore therethrough with an inner diameter. It further includes providing a second article having the same first local length as the first article, and an outer diameter that fits within the inner diameter of the bore with a clearance therebetween. A chamfer or bevel is formed at one end of the clearance of at least one of the first article and the second article, preferably the first article. The volume of a chamfer-bounded region between the first article and the second article is no less than the volume of an unchamfered clearance region between the first article and the second article. The second article is assembled into the bore of the first article, and a quantity of a thermosetting adhesive is placed into the chamfer-bounded region. The assembly of first article and second article is heated to a flow temperature at which the adhesive flows into and fills the unchamfered clearance region but does not cure in the time required for the adhesive to flow and fill the unchamfered clearance region. The adhesive is thereafter cured to complete the joining.

In the preferred application of the method, the first article is the roll module of a pitch-and-roll gimbal, with a pair of spaced apart annular support rings. The second article is the pitch module, which has a pair of oppositely disposed bushings that are fixed to the support rings of the roll module. The mating surfaces on the two modules are prepared for joining by cleaning, grit blasting, and priming. They are next aligned to each other using appropriate tooling.

A quantity of a thermosetting adhesive, preferably a curable epoxy adhesive, is placed into the groove defined by the chamfer. The assembly, still in the tooling, is carefully heated to a temperature at which the adhesive flows due to reduced viscosity but does not immediately cure. The adhesive flows into the clearance region between the two modules by a combination of capillary action and gravity. The adhesive does not leak from the clearance region onto the external faces of either module, avoiding the need for subsequent cleanup of those faces. After the adhesive has flowed into the clearance region, the adhesive is cured by extended time at the flow temperature or heating to a somewhat higher temperature.

In the pitch-and-roll assembly, there are two bushing/ring locations that must be joined. The two joinings could be accomplished simultaneously or serially according to the present approach. It has been found preferable to join them serially.

The present invention provides an effective, reliable, inexpensive approach to the joining of two articles during component fabrication. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1A:
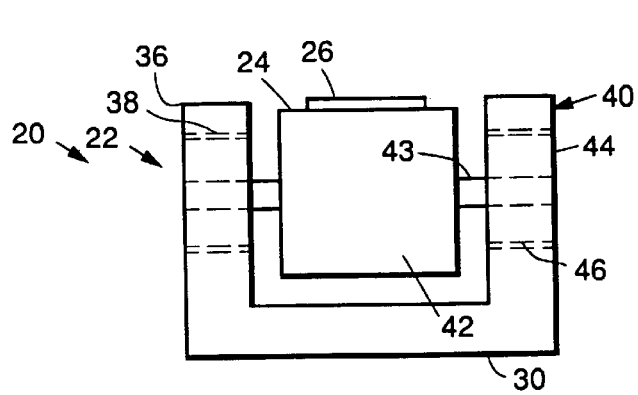
FIG. 1*a* is a schematic elevational view of a pitch-and-roll assembly, taken from a first direction.
Figure 1B:
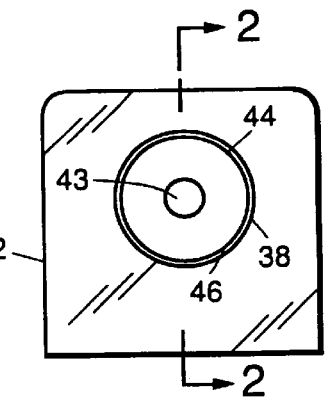
FIG. 1b is a schematic elevational view of the pitch-and-roll assembly, taken from a second direction at a right angle to the first direction.

FIGS. 1a and 1b depict two views of a roll-and-pitch assembly 20 whose fabrication is the preferred application of the present invention. The depiction of FIGS. 1a and 1b is highly schematic, with the components and features drawn with exaggerated separations so that they may be seen distinctly. In practice, the assembly 20 is a much more tightly configured structure. It will be appreciated, however, that the exact internal structure and configuration of the assembly 20 is not a feature of the present invention, which deals specifically with the method of joining and aligning of two elements of structure.

The assembly 20 includes a roll module 22 and a pitch module 24. An electronic seeker 26, such as an infrared sensor, is mounted to the pitch module 24. The roll module 22, pitch module 24, and seeker 26 are fabricated separately and then joined during final assembly. The present invention deals with the aligning and joining of the pitch module 24 and the roll module 22.

The roll module 22 includes a housing 30. The housing 30 has two spaced-apart upright support arms 36, each of which has therethrough a transverse bore 38 having an inner diameter. The bore 38 and adjacent portions of the support arms 36 function as a gimbal ring 40, as shown in FIG. 2.

The pitch module 24 has a body 42 upon which the seeker 26 is mounted. Extending outwardly from opposite sides of the body are two pivot arms 43 that are rotationally pivoted within bushings 44. The bushings 44 have an outer diameter that fits within the inner diameter of the bore 38 with a clearance 46 therebetween. In the figures, the size of the clearance has been exaggerated for illustration. The clearance 46 in practice is typically about 0.006 inch.

The roll module 22 and pitch module 24 are fabricated as separate units and assembled by the method that is the subject of the invention. In the assembly operation, the bushings 44 are placed within the bores 38 of the gimbal ring 40, and then fixedly joined thereto. The bushings 44 do not rotate within the bores 38—rotational movement of the pitch module body 42 is achieved by rotation of the pivot arms 42 within the bushings 44.

Figure 2:
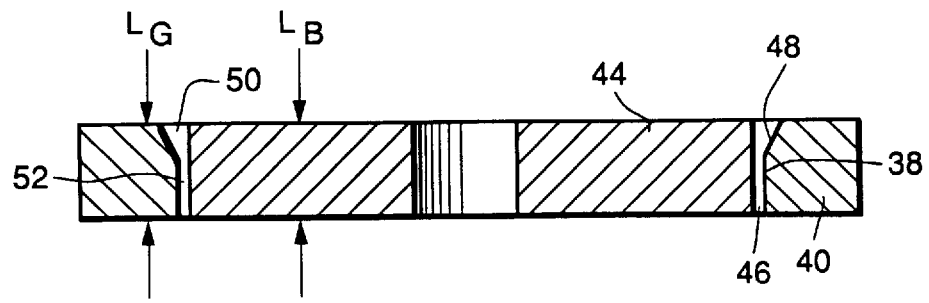
FIG. 2 is a schematic sectional view through the bushing and support ring region of the assembly taken along line 2—2, illustrating the as-machined parts.

FIG. 2 shows only the gimbal ring 40 and bushing 44 portions of the structure described in relation to FIG. 1, the portions pertinent to the assembly method. The bushing 44 fits within the bore 38 of the gimbal ring 40, with the clearance 46. As illustrated, bushing 44 has a length $L_B$ fitting within the gimbal ring 40 having about the same length $L_B$.

One of the two articles 40 and 44 being joined, in this case the outermost gimbal ring 40, has a chamfer 48 at one end of the clearanced region. The chamfer 48 is a bevel formed at one end of the bore 38 of the gimbal ring 40. In one embodiment, the chamfer is a 45 degree bevel. Alternatively, the chamfer could be formed on the inner article, the bushing, or a double chamfer could be formed on the two articles.

As seen in FIG. 2, the chamfer 48 creates two regions along the length of the bore 38. A chamfer-bounded region 50 has a total volume that includes the volume of the chamfer 48 and the volume of that portion of the clearance 46 that lies radially adjacent to the chamfer 48. An unchamfered clearance region 52 has a volume that includes the volume of the clearance 46 that extends along that portion of the length of the bore 38 which is not cut by the chamfer 48. In the preferred embodiment, presented by way of example, the dimensions $L_G$ and $L_B$ are each about 0.200 inch, the length of the chamfer-bounded region 50 along the bore 38 is about 0.050 inch, and the length of the unchamfered clearance region 52 along the bore is about 0.150 inch.

FIG. 2 illustrates the articles 40 and 44 in an assembled arrangement. Tooling (not shown), which also may be described as fixturing, is typically provided to hold the articles solidly and reliably in the desired positions relative to each other in this assembled arrangement. The tooling typically includes clamp structures for both articles 40 and 44, which may be adjustable as needed.

Figure 3:
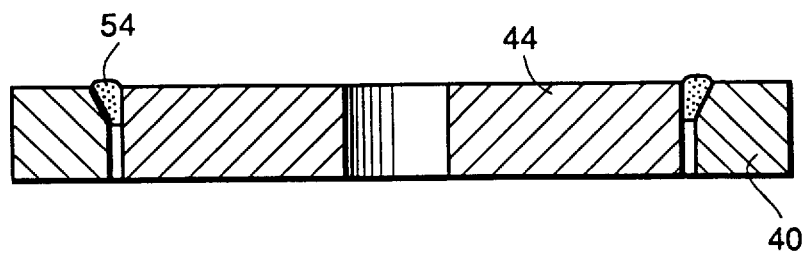
FIG. 3 is a schematic sectional view of the same region as FIG. 2, but after adhesive has been applied to the chamfer region.

After the articles 40 and 44 are assembled as illustrated in FIG. 2, a quantity of an adhesive 54 is placed into the recess formed by the chamfer-bounded region 50 as shown in FIG. 3. The adhesive 54 is provided as a bead distributed evenly around the circumference of the chamfer-bounded region 50, and is typically applied from a syringe. The preferred adhesive is a curable thermosetting compound, most preferably an epoxy compound. In a prototype assembly made by the inventors, B. F. Goodrich A-1177-B two-component epoxy is used. One component of the epoxy is predominantly epoxy resin and non-reactive fillers. The second component is predominantly polyamide resin curing agent and non-reactive fillers. The two components are mixed in a ratio of about 1:1 by weight.

The total volume of the chamfer-bounded region 50 is preferably at least as great as the volume of the unchamfered clearance region 52. The volume of the quantity of adhesive 54 that is placed into the circumferential recess is therefore at least as great as the volume of the unchamfered clearance region 52.

Figure 4:
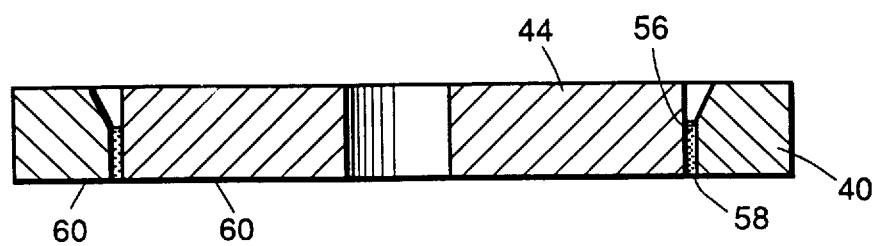
FIG. 4 is a schematic sectional view of the same region as FIG. 2, but after the adhesive has flowed into the clearance region.

The assembly of FIG. 3 is placed into an oven or other heating mechanism and heated to a flow temperature at which the adhesive softens and flows but does not immediately cure. In the case of the preferred epoxy adhesive, a flow temperature of about 125°+/−10° F. has been found operable. During the period of heating to this flow temperature and initial residence time at the flow temperature, the softened, flowable adhesive is drawn by capillary action and gravity from the chamfer-bounded region 50 into the unchamfered clearance region 52. The resulting positioning of the adhesive mass, termed a bonding adhesive 56, is shown in FIG. 4. The bonding adhesive 56 is the same material as the adhesive 54, except that its position has been shifted by the adhesive flow. For an assembly as previously described, the preferred adhesive, and the flow temperature of 125° F., about one hour is required to complete the flow of the adhesive into the unchamfered clearance region.

After the adhesive has flowed to create the bonding adhesive 56 mass, the adhesive is further exposed to an elevated curing temperature to cure and thereby harden the adhesive. The curing may be accomplished by maintaining the assembly at the flow temperature (i.e., so that the curing temperature is the same as the flow temperature) for an extended period of time, the preferred approach. Curing of the preferred epoxy adhesive requires an additional curing time of about one hour. Alternatively, the temperature may be raised to a higher curing temperature, as may be specified for any particular adhesive.

After curing, the articles 40 and 44 are bonded together by the cured bonding adhesive 56 along the unchamfered clearance region. FIGS. 2–4 illustrate the bonded structure at one end of the pitch module body 42. After bonding at that end is complete, the process may be repeated at the other end, using the same steps as discussed above. Alternatively, both ends may be bonded at the same time using the steps discussed above.

The bonding approach of the invention is to be contrasted with one in which no chamfer is present, in which the adhesive is placed between the articles before assembly, or in which the adhesive is directly injected into a clearance between articles, as with a syringe directly into an unchamfered clearance region. In the present approach wherein the adhesive is drawn into its final position by capillarity, no adhesive can flow out a clearance region back side 58 and thence onto an assembly back side 60. By contrast, in these other approaches, adhesive may well be forced through the joint region and onto the assembly back side 60, necessitating a cleanup of the assembly back side 60 to remove the excess adhesive. In some designs, and in particular in the case of a roll and pitch assembly of interest to the inventors, the assembly back side 60 is physically inaccessible and cannot be cleaned after bonding.

Figure 5:
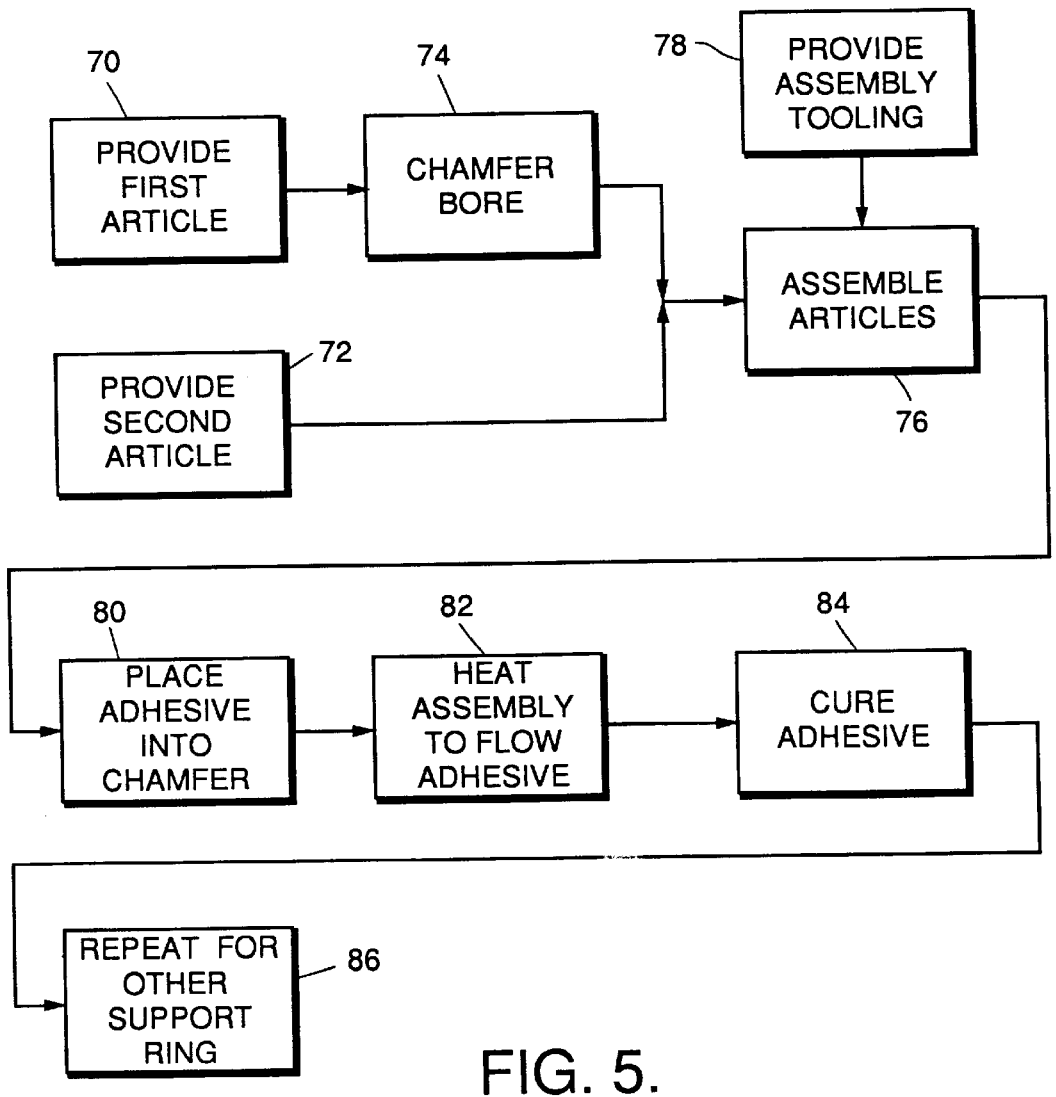
FIG. 5 is a process flow diagram for the preferred approach of the invention.

FIG. 5 illustrates the method of the invention in more detail. A first article, here the gimbal ring 40, is provided, numeral 70. A second article, here the bushing 44, is provided, numeral 72. The bore of one of the articles, here the first article, is chamfered, numeral 74. The articles are assembled, numeral 76, using tooling that is provided, numeral 78.

As part of the assembly process but before actual assembly is made, the parts are preferably cleaned and prepared for bonding. Bulk cleaning is accomplished by immersion of the articles in a tank containing a solution of Ridoline alkaline cleaner in tap water heated to about 160°–190° F. The cleaning solution is rinsed from the articles with clean running tap water. The articles are dried under ambient conditions or in an air circulating oven at a convenient temperature such as about 125°–180° F. The surfaces to be bonded are grit blasted with 320 mesh aluminum oxide media and clean, dry air at about 80 pounds per square inch pressure until a uniform, matte surface is obtained. The grit-blasting debris is removed with clean, dry compressed air and the surfaces are wiped with clean, dry rags or paper wipers. The surfaces to be bonded are primed by an appropriate primer such as a 0.0004–0.001 inch thick (after drying) layer of primer, such as American Cyanamid BR-127 or BR-127NC non-chromated primer, by brush or spray application. The primer is allowed to dry under ambient conditions for at least 30 minutes, followed by drying for at least 30 minutes at about 250° F. The articles are thereafter assembled together and held in a precise position by the tooling.

After assembly, the bead of adhesive is placed into the chamfer, numeral 80. The assembly is heated to cause the adhesive to flow from the chamfer-bounded region into the unchamfered clearance region, numeral 82. The adhesive is cured, numeral 84, to complete the joining of the articles at one location. The process is repeated at other locations as desired, numeral 86.

As described above, the present invention has been practiced on prototype assemblies in the manner discussed above, and found to be fully operable as described.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of aligning and joining a first article and a second article in a preselected relationship to each other, comprising the steps of:

providing a first article having
a first local length, and
a bore therethrough with an inner diameter;

providing a second article having
the same first local length as the first article, and
an outer diameter that fits within the inner diameter of the bore with a clearance therebetween;

forming a chamfer at one end of the clearance of at least one of the first article and the second article, the volume of a chamfer-bounded region between the first article and the second article being no less than the volume of an unchamfered clearance region between the first article and the second article;

assembling the second article into the bore of the first article, wherein the step of assembling includes the steps of
providing assembly tooling operable to hold the first and second articles in the preselected relationship to each other, and
assembling the first and second articles together using the assembly tooling to hold the first and second articles in the preselected relationship to each other; thereafter placing a quantity of a thermosetting adhesive into the chamfer-bounded region; thereafter heating the assembly of first article and second article to a flow temperature at which the adhesive flows into and completely fills the unchamfered clearance region but does not flow out a back side of the clearance region and does not cure in the time required for the adhesive to flow and fill the unchamfered clearance region; and thereafter curing the adhesive.

2. The method of claim 1, wherein the step of providing a first article includes the step of providing a roll module of a pitch-and-roll device, and the step of providing a second article includes the step of providing a pitch module of a pitch-and-roll device.

3. The method of claim 1, wherein the step of forming a chamfer at one end of the clearance at least one of the first article and the second article includes the step of forming a chamfer in the first article.

4. The method of claim 1, wherein the step of assembling includes the steps of cleaning the facing surfaces of the first and second articles, grit blasting the facing surfaces of the first and second articles, and priming the facing surfaces of the first and second articles.

5. The method of claim 1, wherein the step of placing includes the step of providing an epoxy adhesive.

6. The method of claim 1, wherein the step of heating includes the step of heating to a temperature of 125°+/−10° F. for a time of at least about one hour.

7. The method of claim 1, wherein the step of curing includes the step of maintaining the assembly at the flow temperature for a period of time in addition to that required for the adhesive to flow and fill.

8. The method of claim 1, including an additional step, after the step of curing, of joining the first article and the second article at a second location.

9. A method of aligning and joining a first article and a second article in a preselected relationship to each other, comprising the steps of:

providing a first article having
   a bore therethrough with an inner diameter, and
   a chamfered region at an end of the bore;
providing a second article having
   the same first local length as the first article, and
   an outer diameter that fits within the inner diameter of the bore with an unchamfered clearance region therebetween;
assembling the second article into the bore of the first article, wherein the step of assembling includes the steps of
   providing assembly tooling operable to hold the first and second articles in a preselected relationship to each other, and
   assembling the first and second articles together using the assembly tooling to hold the first and second articles in the preselected relationship to each other; thereafter
placing a quantity of a thermosetting adhesive into the chamfered region, the quantity of adhesive being sufficiently large to fill the unchamfered clearance region; thereafter
heating the assembly of first article and second article to a flow temperature at which the adhesive flows from the chamfered region into and completely fills the unchamfered clearance region but does not flow out a back side of the clearance region and does not cure in the time required for the adhesive to flow and fill the unchamfered clearance region; and thereafter
curing the adhesive.

10. The method of claim 9, wherein the step of providing a first article includes the step of providing a roll module of a pitch-and-roll device, and the step of providing a second article includes the step of providing a pitch module of a pitch-and-roll device.

11. The method of claim 9, wherein the step of assembling includes the steps of cleaning the facing surfaces of the first and second articles, grit blasting the facing surfaces of the first and second articles, and priming the facing surfaces of the first and second articles.

12. The method of claim 9, wherein the step of placing includes the step of providing an epoxy adhesive.

13. The method of claim 9, wherein the step of heating includes the step of heating to a temperature of 125°+/−10° F. for a time of at least about one hour.

14. The method of claim 9, wherein the step of curing includes the step of maintaining the assembly at the flow temperature for a period of time in addition to that required for the adhesive to flow and fill.

15. The method of claim 9, including an additional step, after the step of curing, of joining the first article and the second article at a second location.

* * * * *